United States Patent
Edwards et al.

(10) Patent No.: US 12,231,597 B2
(45) Date of Patent: Feb. 18, 2025

(54) COMPUTER-BASED SYSTEMS CONFIGURED FOR AUTOMATICALLY GENERATING FICTITIOUS CALL SESSION INTERACTION PARAMETER(S) AND METHODS OF USE THEREOF

(71) Applicant: Capital One Services, LLC, McLean, VA (US)

(72) Inventors: Joshua Edwards, Philadelphia, PA (US); Asher Smith-Rose, Midlothian, VA (US); Tyler Maiman, Melville, NY (US); Lin Ni Lisa Cheng, Great Neck, NY (US); Shabnam Kousha, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 349 days.

(21) Appl. No.: 17/945,620

(22) Filed: Sep. 15, 2022

(65) Prior Publication Data
US 2024/0098177 A1    Mar. 21, 2024

(51) Int. Cl.
*H04M 3/42*    (2006.01)

(52) U.S. Cl.
CPC .............................. *H04M 3/42008* (2013.01)

(58) Field of Classification Search
CPC .................................................. H04M 3/42008
See application file for complete search history.

(56) References Cited

U.S. PATENT DOCUMENTS

| | | | |
|---|---|---|---|
| 8,145,680 B2 | 3/2012 | Lippert et al. | |
| 9,973,625 B1* | 5/2018 | Voorhees | H04L 63/08 |
| 10,812,349 B2 | 10/2020 | Raney et al. | |
| 11,824,994 B2* | 11/2023 | Barakat | H04L 9/3247 |
| 11,921,692 B1* | 3/2024 | Kousha | H04M 1/575 |
| 2005/0198146 A1 | 9/2005 | Chowdhury et al. | |
| 2018/0295140 A1* | 10/2018 | Lu | G06F 16/951 |

(Continued)

FOREIGN PATENT DOCUMENTS

WO    WO-2021148636 A1 *    7/2021    ............. G06F 21/32

*Primary Examiner* — Adam D Houston
(74) *Attorney, Agent, or Firm* — GREENBERG TRAURIG, LLP

(57) ABSTRACT

A computer-implemented method comprising: instructing a computing device to obtain a permission from the user to monitor a plurality of activities executed within the computing device; receiving a call session request from a computing device associated with a second user; utilizing a trained machine learning algorithm to confirm an identity of the user based on the call session interaction parameter to confirm the call interaction session as a verified call interaction session; generating a fictitious call session interaction parameter that differs from the at least one call session interaction parameter; modifying the call session request into a verified call session request by replacing the call session interaction parameter with the fictitious call session interaction parameter; utilizing a telecommunication network to transmit the verified call session request with the at least one fictitious session interaction parameter to the first calling-enabled computing device; automatically instructing the first calling-enabled computing device to modify a call session notification GUI to display notification data.

20 Claims, 7 Drawing Sheets

(56) References Cited

U.S. PATENT DOCUMENTS

| | | | | |
|---|---|---|---|---|
| 2019/0182293 | A1* | 6/2019 | McErlane | H04L 9/0872 |
| 2021/0058507 | A1* | 2/2021 | Cornwell | G06F 18/214 |
| 2021/0358503 | A1* | 11/2021 | Keret | G10L 17/06 |
| 2022/0377171 | A1* | 11/2022 | Joshi | H04M 3/42085 |
| 2023/0208966 | A1* | 6/2023 | Zheng | G06V 20/46 |
| | | | | 379/189 |
| 2023/0239150 | A1* | 7/2023 | Cheng | H04L 9/3213 |
| | | | | 713/168 |
| 2023/0308425 | A1* | 9/2023 | Singh | H04L 63/08 |
| 2024/0073258 | A1* | 2/2024 | Edwards | G06N 20/00 |
| 2024/0086262 | A1* | 3/2024 | Kousha | G06F 3/04847 |
| 2024/0089371 | A1* | 3/2024 | Lohar | H04M 3/436 |
| 2024/0098177 | A1* | 3/2024 | Edwards | H04M 3/42008 |
| 2024/0104189 | A1* | 3/2024 | Edwards | G06F 21/50 |
| 2024/0146751 | A1* | 5/2024 | Tessler | H04L 63/1416 |
| 2024/0232327 | A1* | 7/2024 | Maiman | G06F 21/629 |
| 2024/0241876 | A1* | 7/2024 | Kousha | G06F 16/23 |

* cited by examiner

COMPUTER-BASED SYSTEMS CONFIGURED FOR AUTOMATICALLY GENERATING FICTITIOUS CALL SESSION INTERACTION PARAMETER(S) AND METHODS OF USE THEREOF

FIELD OF TECHNOLOGY

The present disclosure generally relates to computer-based systems configured for automatically generating a fictitious call session interaction parameter and methods of use thereof.

BACKGROUND OF TECHNOLOGY

Typically, any phone call between two devices may allow at least one device to re-dial the phone number associated with the other device. This ability to re-dial the phone number associated with the other device may be unwanted or may be a potential security risk associated with either device. This potential security risk tied to the ability to re-dial the phone number associated with either device may decrease a level of optimization and efficiency in providing secure interaction sessions with a call center.

SUMMARY OF DESCRIBED SUBJECT MATTER

In some embodiments, the present disclosure provides an exemplary technically improved computer-based method that includes at least the following steps of instructing, by at least one processor of a call forwarding server, a first calling-enabled computing device associated with a first user to obtain, via at least one graphical user interface (GUI) having at least one programmable GUI element, a permission from the first user to monitor a plurality of calling-related activities executed within the first phone; instructing, by the at least one processor of the call forwarding server, the first calling-enabled computing device to continually monitor, in response to obtaining the permission from the user, the plurality of calling-related activities executed within the first calling-enabled computing device for a predetermined period of time; receiving, by the at least one processor of the call forwarding server, a call session request from a second calling-enabled computing device associated with a second user, where the call session request is configured to request the call forwarding server to facilitate establishing a call interaction session with the first calling-enabled computing device, where the call session request includes at least one call session interaction parameter associated with the first calling-enabled computing device; utilizing, by the at least one processor of the call forwarding server, at least one trained machine learning algorithm to confirm an identity of the second user based on the at least one call session interaction parameter to so as to confirm the call interaction session as a verified call interaction session when the at least one call session interaction parameter is associated with at least one of a particular entity, a particular individual, or a particular physical location based on a database of known session interaction parameters; for the verified call interaction session: automatically generating, by the at least one processor of the call forwarding server, a fictitious call session interaction parameter that differs from the at least one call session interaction parameter associated with the second calling-enabled computing device of the second user, where the fictitious call session interaction parameter is configured to prevent the first calling-enabled computing device to initiate another call interaction session with the first calling-enabled computing device; automatically modifying, by the at least one processor of the call forwarding server, the call session request into a verified call session request by replacing the at least one call session interaction parameter with the at least one fictitious call session interaction parameter; automatically utilizing, by the at least one processor of the call forwarding server, a first telecommunication network to transmit the verified call session request with the at least one fictitious session interaction parameter to the first calling-enabled computing device; automatically instructing, by the at least one processer of the call forwarding server, the first calling-enabled computing device, when receiving the verified call session request, to modify a call session notification graphical user interface (GUI) to display, via at least one programmable output GUI element of the call session notification GUI, notification data, including: at least one identifier associated with the identity of the second user, the at least one fictitious session interaction parameter, and an indication that is configured to indicate that the verified call session request has been verified as being legitimate; and where the fictitious session interaction parameter is configured to prevent the first calling-enabled computing device to initiate another call interaction session with the second calling-enabled computing device.

In some embodiments, the present disclosure provides an exemplary technically improved computer-based method that includes at least the following steps of instructing, by at least one processor of a call forwarding server, a first calling-enabled computing device associated with a first user to obtain, via at least one graphical user interface (GUI) having at least one programmable GUI element, a permission from the first user to monitor a plurality of calling-related activities executed within the first calling-enabled computing device; receiving, by the at least one processor of the call forwarding server, a call session request from a second calling-enabled computing device associated with a second user; wherein the call session request comprises at least one call session interaction parameter associated with the first calling-enabled computing device; utilizing, by the at least one processor of the call forwarding server, at least one trained machine learning algorithm to confirm an identity of the second user based on the at least one call session interaction parameter so as to confirm the call interaction session as a verified call interaction session when the at least one call session interaction parameter is associated with at least one of a particular entity, a particular individual, or a particular physical location based on a database of known session interaction parameters; for the verified call interaction session: automatically generating, by the at least one processor of the call forwarding server, a fictitious call session interaction parameter that differs from the at least one call session interaction parameter associated with the second calling-enabled computing device of the second user, wherein the fictitious call session interaction parameter is configured to prevent the first calling-enabled computing device to initiate another call interaction session with the second calling-enabled computing device; automatically instructing, by the at least one processor of the call forwarding server, the first calling-enabled computing device, to prevent, based on the automatically generated fictitious call session interaction parameter, the first calling-enabled computing device to initiate another call interaction session with the second calling-enabled computing device.

In some embodiments, the present disclosure provides a non-transient computer memory, storing software instructions; at least one processor of a first computing device associated with a user; wherein, when the at least one processor executes the software instructions, the first calling-enabled computing device is programmed to: instruct a first calling-enabled computing device associated with a first user to obtain, via at least one graphical user interface (GUI) having at least one programmable GUI element, a permission from the first user to monitor a plurality of calling-related activities executed within the first calling-enabled computing device; receive a call indication when the first calling-enabled computing device receives a call session request from a second calling-enabled computing device associated with a second user; wherein the call session request comprises at least one call session interaction parameter associated with the first calling-enabled computing device; utilize at least one trained machine learning algorithm to confirm an identity of the second user based on the at least one call session interaction parameter to so as to confirm the call interaction session as a verified call interaction session when the at least one call session interaction parameter is associated with at least one of a particular entity, a particular individual, or a particular physical location based on a database of known session interaction parameters; for the verified call interaction session: automatically generate a fictitious call session interaction parameter that differs from the at least one call session interaction parameter associated with the second calling-enabled computing device of the second user, wherein the fictitious call session interaction parameter is configured to prevent the first calling-enabled computing device to initiate another call interaction session with the second calling-enabled computing device; automatically instruct the first calling-enabled computing device to modify the call session request into a verified call session request by replacing the at least one call session interaction parameter with the at least one fictitious call session interaction parameter; and wherein the fictitious session interaction parameter is configured to prevent the first calling-enabled computing device to initiate another call interaction session with the second calling-enabled computing device.

BRIEF DESCRIPTION OF THE DRAWINGS

Various embodiments of the present disclosure may be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
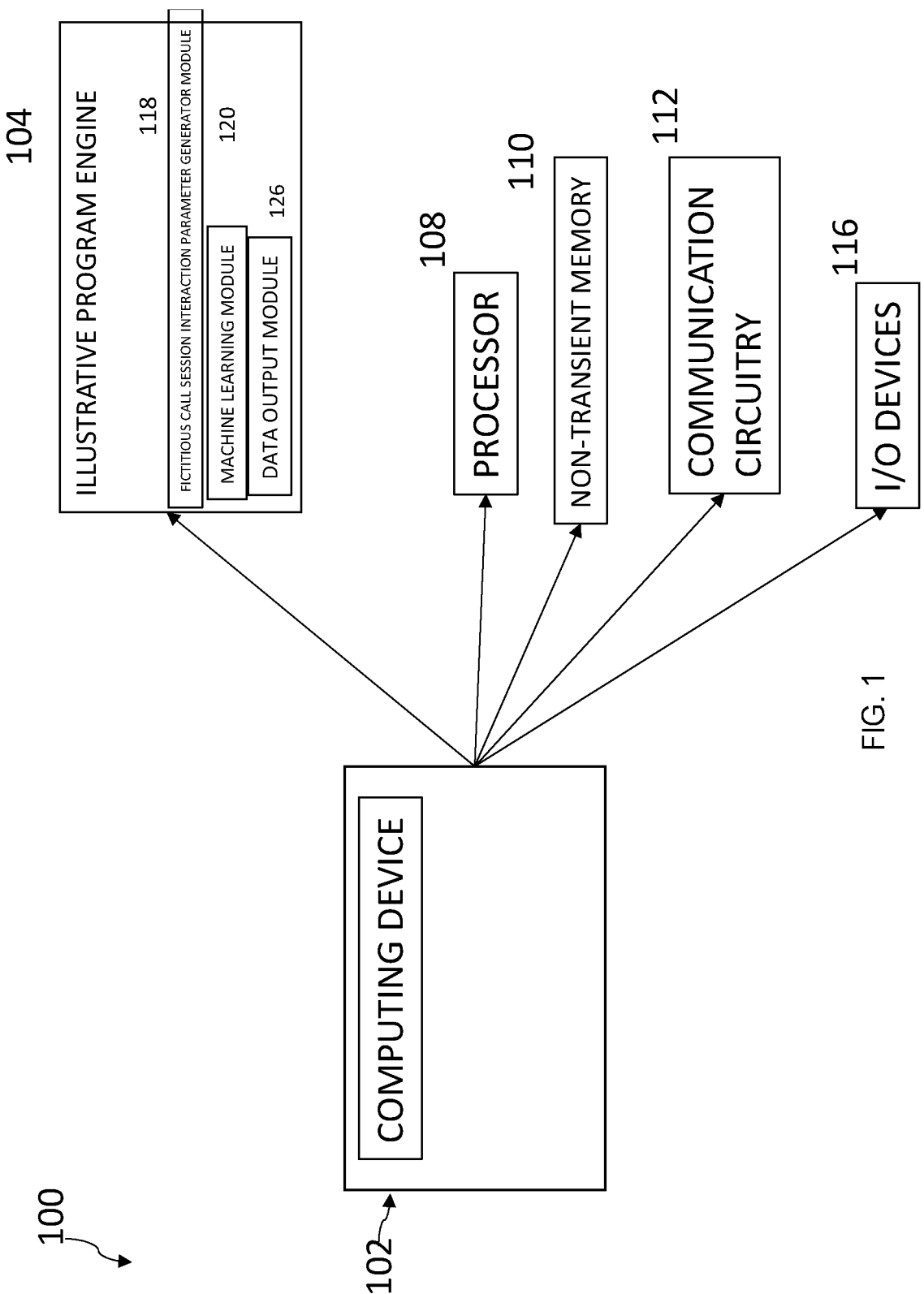
FIG. 1 is a block diagram show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it may be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set may be interpreted as meaning each of the items singularly as alternatives, as well as any combination of the listed items.

It is understood that at least one aspect/functionality of various embodiments described herein may be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation may be used in guiding the physical process.

As used herein, the term "dynamically" and term "automatically," and their logical and/or linguistic relatives and/or derivatives, may be directed to certain events and/or actions that may be triggered and/or occur without any human intervention. In some embodiments, events and/or actions in accordance with the present disclosure may be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of a software application.

At least some embodiments of the present disclosure provide technological solution(s) to a technological computer-centered problem associated with allowing at least one device within an interaction session with at least one other device an ability to initiate another interaction session with the at least one other device. The technological computer-centered problem associated with allowing at least one device the ability to initiate another interaction session typically arises due to the ability for a device to transmit a signal based on a call session interaction parameter associated with the device within the interaction session. The technological computer-centered problem increases the risk of security breaches associated with the initiation of an interaction session between at least two computing devices. In some embodiments, the present disclosure may utilize a processor within a call forwarding system to automatically generate a fictious call session parameter associated with the device, which prevents a second device from initiating another call interaction session with the device. In some embodiments, the present disclosure may automatically modify a call session request into a verified call session by replacing the at least one call session interaction parameter with at least one fictitious call session interaction parameter. In some embodiments, the present disclosure may automatically utilize a first telecommunication network to transmit the verified call session request with the at least one fictitious session interaction parameter to the device. In some embodiments, the present disclosure may modify a call session notification GUI to display notification data. In some instances, the notification data may refer to at least one identifier associated with the identity of a user associated with the second device, the at least one fictitious session interaction parameter, and an indication that is configured to indicate that the verified call session request has been verified as legitimate. In some embodiments, the present disclosure provides a computer-centric technological solution that may automatically generate a fictious call session interaction parameter that is configured to prevent at least one calling-enabled computing device to initiate another call interaction session with the at least one other calling-enabled computing device. In some instances, the computer-centric technological solution may include automatically modifying a call session into a verified call session request by replacing at least one session interaction parameter with the fictitious call session based on a utilization of at least one trained machine learning algorithm. In some instances, the computer-centric technological solution may include automatically utilizing at least one telecommunication network to transmit the verified call session request with the at least one fictitious session parameter to at least another calling-enabling computing device.

FIG. 1 depicts a block diagram of an exemplary computer-based system and platform for automatically generating a fictitious call session interaction parameter that is configured to prevent at least one calling-enabled computing device to initiate another call interaction session with the at least one other calling-enabled computing device.

In some embodiments, an illustrative computing system of the present disclosure 100 may include a computing device 102 associated with a user and an illustrative program engine 104. In some embodiments, the program 104 may be stored on the computing device 102. In some embodiments, the illustrative program engine 104 may reside on a server computing device 106 (not shown). In some embodiments, the computing device 102 may include a processor 108, a non-transient memory 110, a communication circuitry 112 for communicating over a communication network 114 (not shown), and input and/or output (I/O) devices 116 such as a keyboard, mouse, a touchscreen, and/or a display, for example. In some embodiments, the computing device 102 may be at least one calling-enabled computing device of a plurality of calling-enabled computing devices. For example, the computing device 102 a smart phone, a smart watch, and/or a smart tablet. In some instances, the computing device 102 may be the at least one calling-enabled computing device with an ability to execute a plurality of activities. In some instance, at least one activity of the plurality of activities may refer to an ability to initiate an interaction session. In some embodiments, the server computing device 106 may refer to a call forwarding server.

In some embodiments, the illustrative program engine 104 may be configured to instruct the processor 108 to execute one or more software modules such as, without limitations, a fictitious call session interaction parameter generator module 118, a machine learning module 120, and/or a data output module 122.

In some embodiments, an exemplary fictitious call session interaction parameter generator module 118, of the present disclosure, utilizes at least one machine learning algorithm described herein, to automatically generate a fictitious call session interaction parameter that is configured to prevent at least one calling-enabled computing device 102 to initiate another call interaction session with the at least one other calling-enabled computing device and automatically modify a verified call session request by replacing at least one call session interaction parameter with the automatically generated fictitious call session interaction parameter. In some embodiments, the exemplary fictitious call session interaction parameter generator module 118 may instruct a first computing device 102 of a plurality of computing devices 102 associated with at least one user of a plurality of users to obtain a permission from the first user to monitor a plurality of calling related activities executed within the first computing device 102. In some embodiments, the exemplary fictitious call session interaction parameter generator module 118 may continually monitor the plurality of calling relating activities executed within a predetermined period of time. In some instances, the exemplary fictitious call session interaction parameter generator module 118 may continually monitor the plurality of calling-related activities in response to obtaining the permission from the at least one user. In some embodiments, calling-related activities may include, without limitation, at least one or more of: receiving a call, dropping a call/hang-up, making a call, texting during a call, putting a caller on hold, launching an app during a call, after-call work, talk time, hold time, or wrap time. In some embodiments, the exemplary fictitious call session interaction parameter generator module 118 may receive a call session request from a different computing device. In some embodiments, the exemplary fictitious call session interaction parameter generator module 118 may utilize the call session request to request the server computing device 106 to facilitate establishing a call interaction session with the first computing device 102. In some instances, the call session request may refer to at least one call session interaction parameter associated with the first computing device 102. In some embodiments, the exemplary fictitious call session interaction parameter generator module 118 may utilize at least one machine learning module 120 to confirm an identity of the different computing device based on the at least one call session interaction parameter. In some embodiments, the exemplary fictitious call session interaction parameter generator module 118 may confirm the identity of the different computing device by confirming the call interaction session as the verified call interaction session when the at least one call session interaction parameter is associated with at least one of a particular entity, a particular individual, or a particular physical location based on a database of known session interaction parameters. In some embodiments, the exemplary fictitious call session interaction parameter generator module 118 may automatically generate at least one fictitious call session interaction parameter that differs from the at least one call session interaction parameter associated with the second computing device. In some embodiments, the exemplary fictitious call session interaction parameter generator module 118 may automatically modify the call session request into a verified call session request by replacing the at least one call session interaction parameter with the at least one fictitious call session interaction parameter. In some embodiments, the exemplary fictitious call session interaction parameter generator module 118 may automatically utilize at least one telecommunication network of a plurality of telecommunication networks to transmit the verified call session request with the at least one fictitious call session interaction parameter. In some embodiments, the exemplary fictitious call session interaction parameter generator module 118 may automatically instruct the first computing device 102 to modify a call session notification GUI to display notification data in response to receiving the verified call session request.

In some embodiments, the present disclosure describes systems for utilizing the machine learning module 120 that may automatically generate the at least one fictitious call session interaction parameter that differs from the at least one call session interaction parameter associated with the other computing device. In some embodiments, the machine learning module 120 may be trained utilizing a call session request to confirm an identity of a plurality of users, where the at least one fictitious call session interaction parameter is configured to prevent the first computing device 102 to initiate another call interaction with the first computing device 102. In some embodiments, the machine learning module 120 may automatically modify the call session request into a verified call session request by replacing the at least one call session interaction parameter with the at least one fictitious call session interaction parameter. In some embodiments, the machine learning module 120 may automatically utilize at least one telecommunication network to transmit the verified call session request with the at least one fictitious session interaction parameter to the first computing device 102. In some embodiments, the machine learning module 120 may automatically instruct the first computing device 102 to modify a call session notification GUI to display notification data in response to receiving the verified call session request.

In some embodiments, the data output module 122 may automatically generate the fictitious call session interaction parameter that differs from the at least one call session interaction parameter associated with the second computing device of the different user. In some embodiments, the data output module 122 may automatically modify the call session request into a verified call session request by replacing the at least one call session interaction parameter with the fictitious call session interaction parameter. In some embodiments, the data output module 122 may automatically utilize the telecommunication network to transmit the verified call session request with the fictitious session interaction parameter to the computing device 102. In some embodiments, the data output module 122 may automatically instruct the computing device 102 to modify a call session notification GUI to display notification data when receiving the verified call session request.

In some embodiments, the illustrative program engine 104 may instruct the first computing device associated with the at least one user to obtain a permission from the first user to monitor a plurality of calling related activities executed within the first computing device 102, via at least one processor of the server computing device 106. In some embodiments, the illustrative program engine 104 may continually monitor the plurality of calling-related activities in response to obtaining the permission from the at least one user. In some embodiments, the illustrative program engine 104 may receive a call session requestion from a second calling-enable computing device associated with a different user. In some embodiments, the illustrative program engine 104 may confirm the identity of the different user based on the at least one call session interaction parameter. In some embodiments, the illustrative program engine 104 may confirm the call interaction session as a verified call interaction session when the at least one call session interaction parameter is associated with a particular entity, a particular individual, or a particular physical location based on a database of known session interaction parameters. In some embodiments, the illustrative program engine 104 may automatically generate a fictitious call session interaction parameter that differs from the call session interaction parameter associated with the second computing device.

In some embodiments, the illustrative program engine 104 may automatically modify the call session requestion into a verified call session request by replacing the at least one call session interaction parameter with the fictitious call session interaction parameter. In some embodiments, the illustrative program engine 104 may automatically utilize a first telecommunication network to transmit the verified call session request with the fictitious session interaction parameter to the computing device 102. In some embodiments, the illustrative program engine 104 may automatically instruct the computing device 102 to modify a call session notification graphical user interface to display when receiving the verified call session.

In some embodiments, the non-transient memory 110 may store the automatically generated fictitious call session interaction parameter. In some embodiments, the non-transient memory 110 may store at least one automatic modification to the call session request. In some embodiments, the non-transient memory 110 may store any data received from the telecommunication network that is capable of transmitting the verified call session request with the fictitious session interaction parameter to the computing device 102. In some embodiments, the non-transient memory 110 may store notification data associated with the modification of the call session notification GUI within the computing device 102. In some embodiments, the non-transient memory 110 may store the output of the exemplary fictitious call session interaction parameter generator module 118. In some embodiments, the non-transient memory 110 may store the output of the trained machine learning module 120. In some embodiments, the non-transient memory 110 may store the output of the data output module 122.

Figure 2:
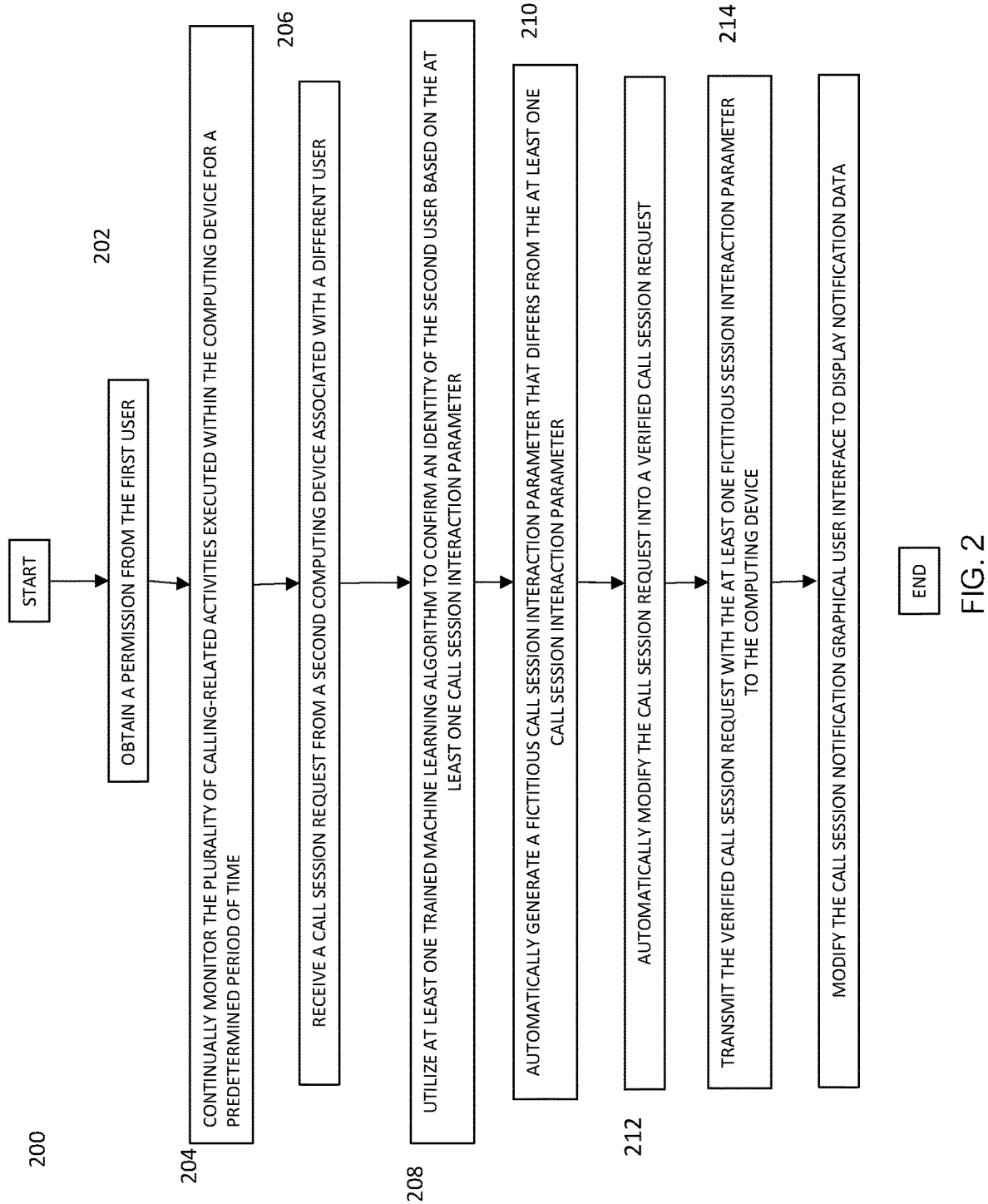
FIG. 2 is a flowchart illustrating operational steps for automatically generating a fictitious call session interaction parameter, in accordance with one or more embodiments of the present disclosure.

FIG. 2 is a flowchart 200 illustrating operational steps for automatically generating a fictitious call session interaction parameter, in accordance with one or more embodiments of the present disclosure.

In step 202, the illustrative program engine 104 within the computing device 102 may be programmed to obtain a permission from the first user. In some embodiments, the illustrative program engine 104 may obtain the permission from the first user to monitor a plurality of calling-related activities executed within the computing device 102. In some embodiments, the illustrative program engine 104 may instruct a calling-enabled computing device associated with the first user to obtain the permission from the first user to monitor the plurality of calling-related activities executed within the computing device 102.

In step 204, the illustrative program engine 104 may continually monitor the plurality of calling-related activities executed within the computing device 102 for a predetermined period of time. In some embodiments, the illustrative program engine 104 may instruct the computing device 102 to continually monitor the plurality of calling-related activities executed within the computing device 102 for a predetermined period of time. In some embodiments, the illustrative program engine 104 may instruct the exemplary fictitious call session interaction parameter generator module 118 to continually monitor the plurality of calling-related activities executed within the computing device 102 for the predetermined period of time in response to obtaining the permission from the first user. In some embodiments, to continually monitor may include periodically running in background monitoring process(es) associated with the exemplary fictitious call session interaction parameter generator module 118 for any activity related to calling functionality of the computing device (e.g., phone). In some embodiments, the computer device may be programmed to continuously transmit alert(s) (e.g., send a message, launch an API call, etc.) to the exemplary fictitious call session interaction parameter generator module 118 and/or the illustrative program engine 104 whenever a user would interact with a dial pad of a phone functionality of the computing device.

In step 206, the illustrative program engine 104 may receive a call session request from a second computing device associated with a different user. In some embodiments, the illustrative program engine 104 may receive the call session request from a second calling-enabled computing device associated with a second user, where the call session request is configured to request the server computing device 106 to facilitate establishing a call interaction session with the computing device 102. In some embodiments, the call session request may refer to at least one call session interaction parameter associated with the computing device 102.

In step 208, the illustrative program engine 104 may utilize at least one trained machine learning algorithm to confirm an identity of the second user based on the at least one call session interaction parameter. In some embodiments, the illustrative program engine 104 may utilize the trained machine learning module 120 to confirm the identity of the second user based on the at least one call session interaction parameter associated with the second user. In some embodiments, the illustrative program engine 104 may confirm the identity of the second user based on the at least one call session interaction parameter to confirm the call interaction session as a verified call interaction session when the at least one call session interaction parameter is associated with at least one particular entity, a particular individual, or a particular physical location based on a database of known session interaction parameters. In some embodiments, the exemplary fictitious call session interaction parameter generator module 118 may train at least one machine learning algorithm by utilizing the monitored plurality of activities, specifically call session request from other computing devices, as input data. In some embodiments, the exemplary fictitious call session interaction parameter generator module 118 may utilize the input data to train the at least one machine learning algorithm to predict the identity of the computing device associated with the initiation of an interaction session.

In step 210, the illustrative program engine 104 may automatically generate a fictitious call session interaction parameter that differs from the at least one call session interaction parameter. In some embodiments, the illustrative program engine 104 may automatically generate the fictitious call session interaction parameter that differs from the at least one call session interaction parameter associated with the second calling-enabled computing device of the second user. In some embodiments, the exemplary fictitious call session interaction parameter generator module 118 may automatically generate a fictitious call session interaction parameter that differs from the at least one call session interaction parameter. In some embodiments, the fictitious call session interaction parameter may be configured to prevent the computing device 102 to initiate another call interaction session with the second computing device 102.

In step 212, the illustrative program engine 104 may automatically modify the call session request into a verified call session request. In some embodiments, the illustrative program engine 104 may automatically modify the call session request into the verified call session request by replacing the at least one call session interaction parameter with the at least one fictitious call session interaction parameter. In some embodiments, the exemplary fictitious call session interaction parameter generator module 118 may automatically modify the call session request into the verified call session request. In some embodiments, the trained machine learning module 120 may automatically modify the call session request into the verified call session request by replacing the at least one call session interaction parameter with the at least one fictitious call session interaction parameter.

In step 214, the illustrative program engine 104 may transmit the verified call session request with the at least one fictitious session interaction parameter to the computing device 102. In some embodiments, the illustrative program engine 104 may utilize at least one telecommunication network to transmit the verified call session request with the at least one fictitious session interaction parameter to the first calling-enabled computing device 102. In some embodiments, the exemplary fictitious call session interaction parameter generator module 118 may utilize at least one telecommunication network to transmit the verified call session request with the at least one fictitious session interaction parameter to the first calling-enabled computing device 102.

In step 216, the illustrative program engine 104 may modify the call session notification graphical user interface ("GUI") to display notification data. In some embodiments, the illustrative program engine 104 may automatically instruct the computing device 102 to modify the call session notification GUI to display notification data. In some embodiments, the illustrative program engine 104 may modify the call session notification GUI to display notification data via at least one programmable output GUI element of the call session notification GUI. In some embodiments, the notification data may refer to at least one identifier associated with the identity of the second user, the at least one fictitious session interaction parameter, and an indication that is configured to indicate that the verified call session request has been verified as being legitimate. In some instances, the exemplary fictitious call session interaction parameter generator module 118 may utilize fictitious session interaction parameter to prevent the computing device 102 to initiate another call interaction session with the second computing device.

Figure 3:
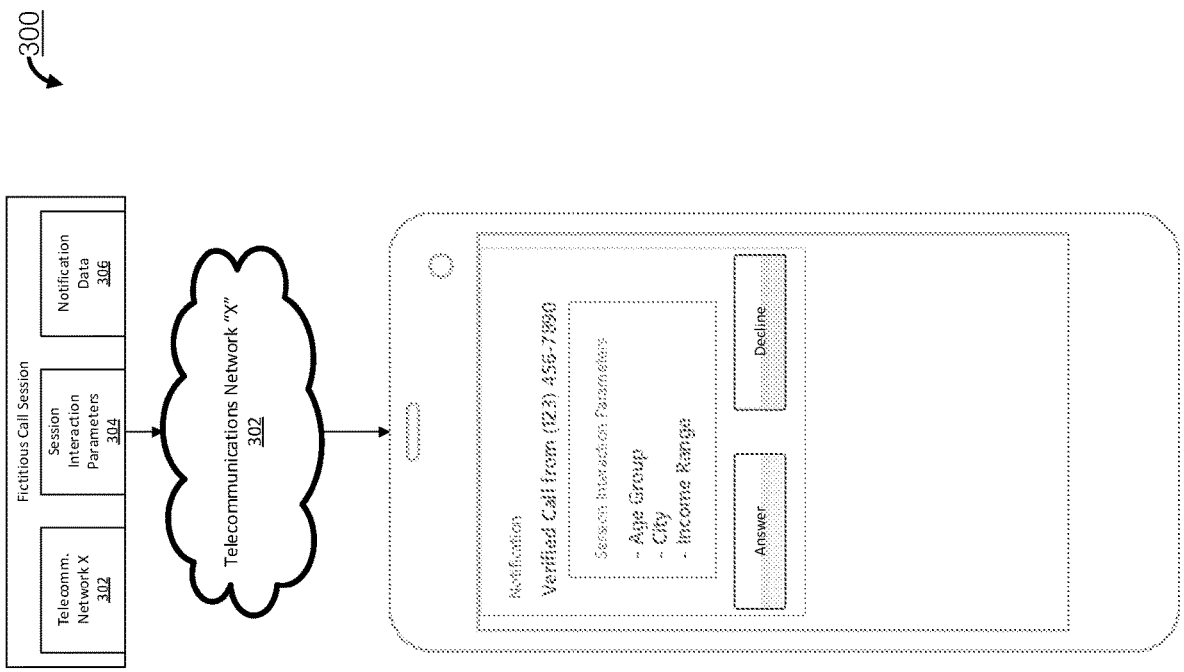
FIG. 3 depicts $[1]_{[NS(MIT2)][BLA(NIT3)][NS(MIT4)}$ an automatic generation of a fictitious call session interaction parameter, in accordance with one or more embodiments of the present disclosure.

FIG. 3 depicts an exemplary diagram 300 of an exemplary computer-based system and platform for automatically generating a fictitious call session interaction parameter, in accordance with at least one embodiment.

In some embodiments, the exemplary fictitious call session interaction parameter generator module 118 may automatically generate a fictitious call session interaction parameter 304 that differs from the at least one call session interaction parameter and utilize at least one telecommunication network 302 to transmit the verified call session request to the computing device 102. In some embodiments, the exemplary fictitious call session interaction parameter generator module 118 may utilize the trained machine learning module 120 to automatically modify the call session request into a verified call session request by replacing the at least one call session interaction parameter with the at least one fictitious call session interaction parameter 304. In some embodiments, the exemplary fictitious call session interaction parameter generator module 118 may automatically generate a fictitious call session interaction parameter 304 that is configured to prevent a second computing device to initiate another call interaction session with the computing device 102. In some embodiments, the exemplary fictitious call session interaction parameter generator module 118 may automatically instruct the computing device 102 to modify a call session notification GUI to display notification data 306. In some embodiments, the exemplary fictitious call session interaction parameter generator module 118 may automatically instruct the computing device 102 when receiving the verified call session request to modify the call session GUI to display, via the at least one programmable output GUI element of the call session notification GUI, notification data 306. In some instances, the notification data 306 may refer to an identifier associated with the identity of the second user, the fictitious session interaction parameter 304, and an indication that is configured to indicate that the verified call session request has been verified as being legitimate.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/ configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/ PDA, television, smart device (e.g., smart phone, smart tablet or smart television), mobile internet device (MID), messaging device, data communication device, and so forth.

As used herein, the term "server" may be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that may be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM I™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

Figure 4:
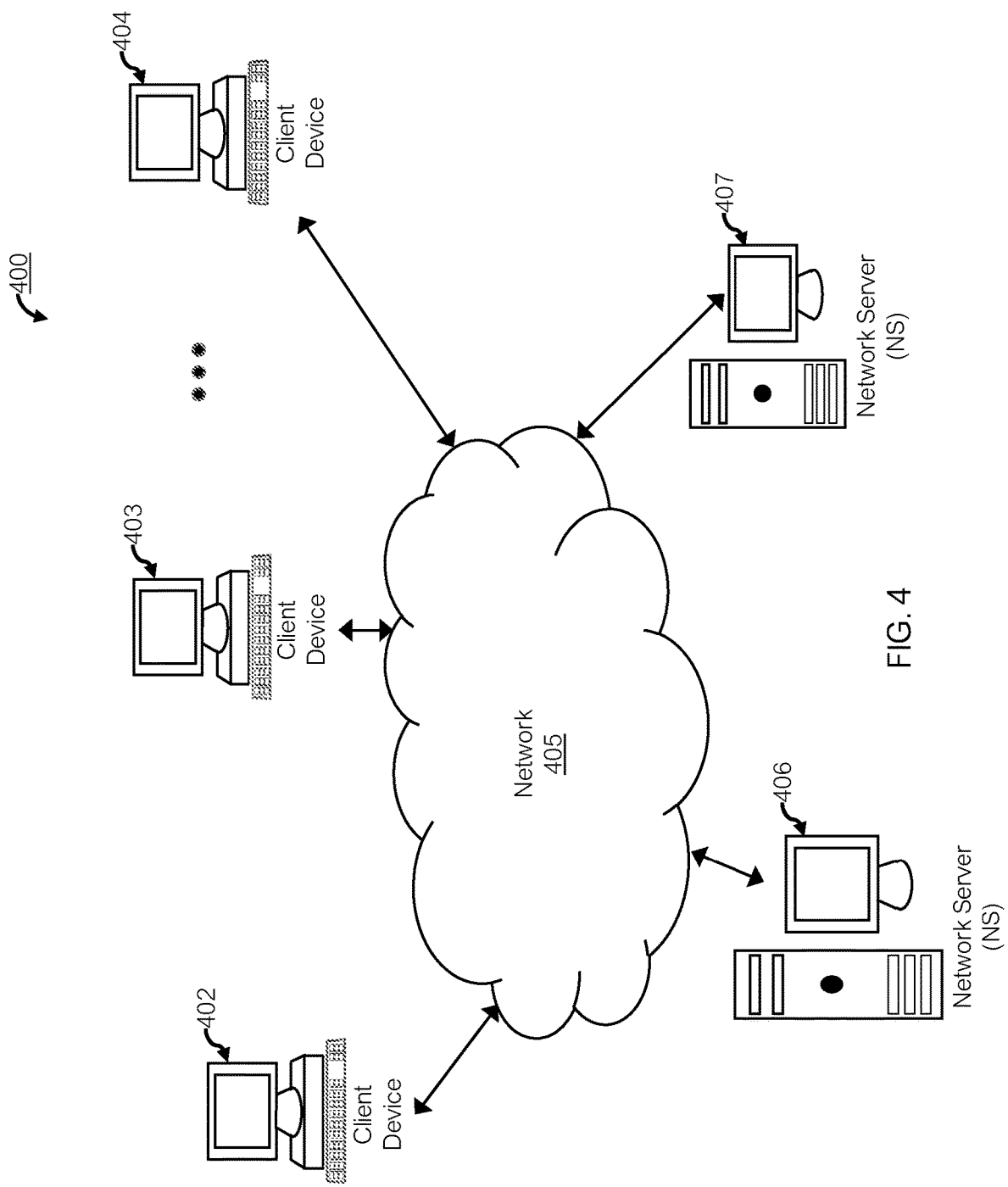
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to automatically update at least one data record including at least one shared data point within a generated database of known queries based on a plurality of indicative markers and displayed via a computing device 102, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary data record update module 118 of the present disclosure, utilizing at least one machine-learning model described herein.

In some embodiments, referring to FIG. 4, members 402-404 (e.g., clients) of the exemplary computer-based system/platform 400 may include virtually any computing device capable of automatically generating a fictitious call session interaction parameter that prevents a computing device to initiate another call interaction session with a different computing device such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary data record update module 118 of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to generate the ficititious call session interaction parameter, modify the call session request into a verified call session request, and display notification data based on the automatic execution of the exemplary fictitious call session interaction parameter generator module 118.

Figure 5:
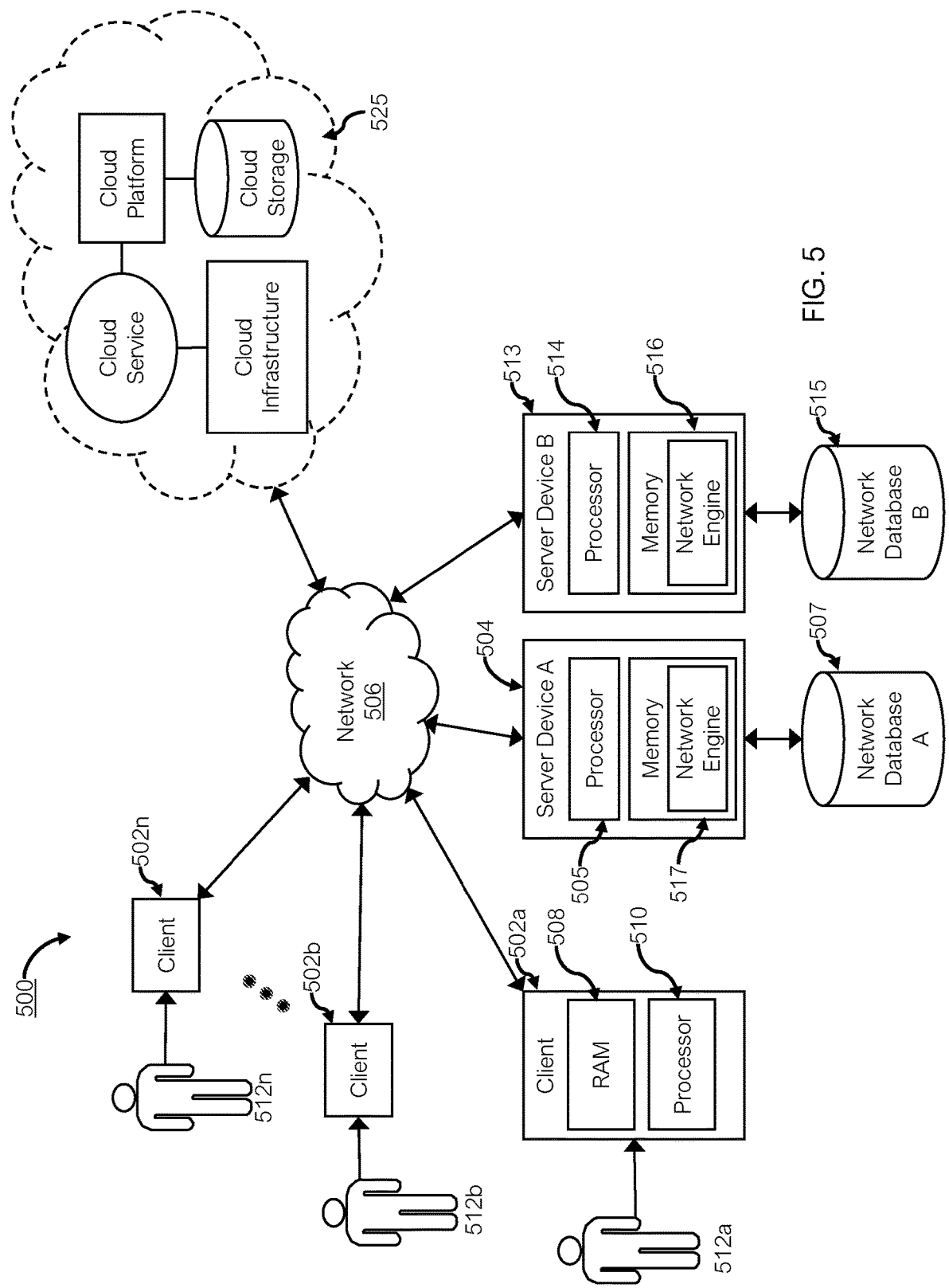
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
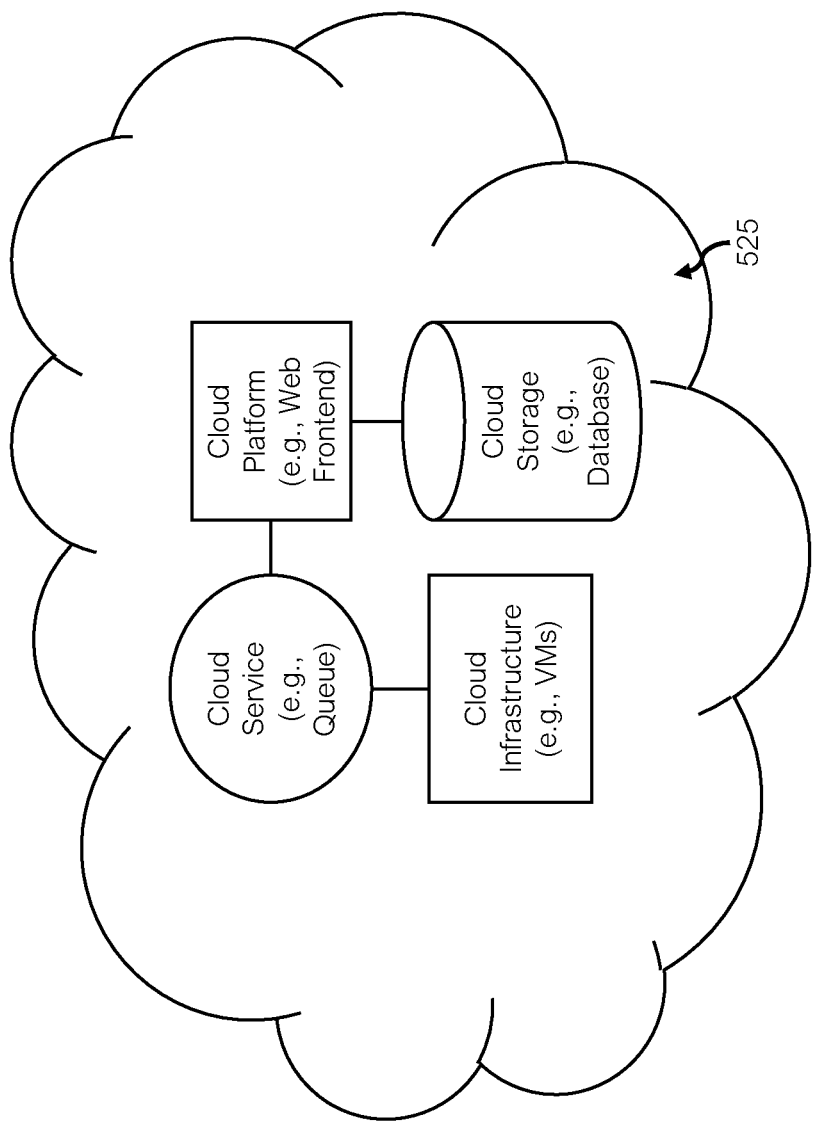
FIGS. 6 and 7 are diagrams illustrating implementations of cloud computing architecture/aspects with respect to which the disclosed technology may be specifically configured to operate, in accordance with one or more embodiments of the present disclosure.
Figure 7:
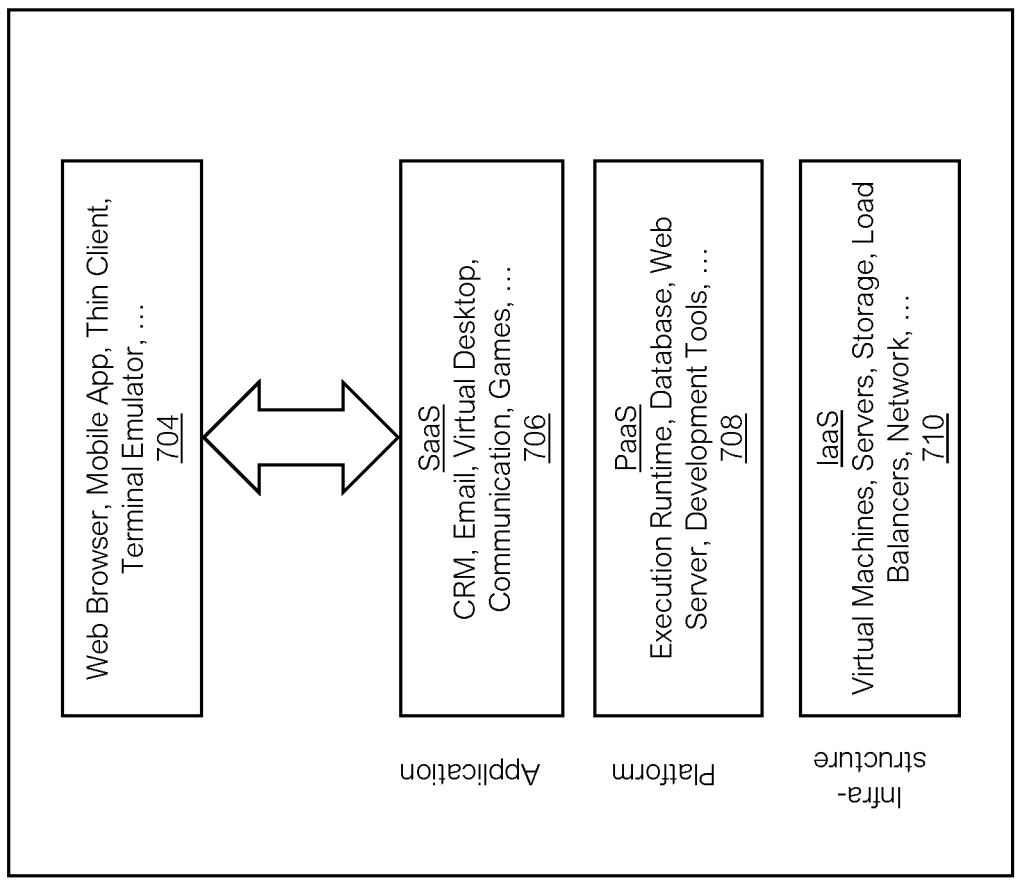

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/ architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

Clause 1. A method may include: instructing, by at least one processor of a call forwarding server, a first calling-enabled computing device associated with a first user to obtain, via at least one graphical user interface (GUI) having at least one programmable GUI element, a permission from the first user to monitor a plurality of calling-related activities executed within the first calling-enabled computing device; receiving, by the at least one processor of the call forwarding server, a call session request from a second calling-enabled computing device associated with a second user; where the call session request comprises at least one call session interaction parameter associated with the first calling-enabled computing device; utilizing, by the at least one processor of the call forwarding server, at least one trained machine learning algorithm to confirm an identity of the second user based on the at least one call session interaction parameter so as to confirm the call interaction session as a verified call interaction session when the at least one call session interaction parameter is associated with at least one of a particular entity, a particular individual, or a particular physical location based on a database of known session interaction parameters; for the verified call interaction session: automatically generating, by the at least one processor of the call forwarding server, a fictitious call session interaction parameter that differs from the at least one call session interaction parameter associated with the second calling-enabled computing device of the second user, where the fictitious call session interaction parameter is configured to prevent the first calling-enabled computing device to initiate another call interaction session with the second calling-enabled computing device; automatically modifying, by the at least one processor of the call forwarding server, the call session request into a verified call session request by replacing the at least one call session interaction parameter with the at least one fictitious call session interaction parameter; automatically utilizing, by the at least one processor of the call forwarding server, a first telecommunication network to transmit the verified call session request with the at least one fictitious session interaction parameter to the first calling-enabled computing device; automatically instructing, by the at least one processer of the call forwarding server, the first calling-enabled computing device, when receiving the verified call session request, to modify a call session notification graphical user interface (GUI) to display, via at least one programmable output GUI element of the call session notification GUI, notification data, including: at least one identifier associated with the identity of the second user, the at least one fictitious session interaction parameter, and an indication that is configured to indicate that the verified call session request has been verified as being legitimate; and where the fictitious session interaction parameter is configured to prevent the first calling-enabled computing device to initiate another call interaction session with the second calling-enabled computing device.

Clause 2. The method according to clause 1, further including instructing the first calling-enabled computing device to continually monitor the plurality of calling-related activities executed within the first calling-enabled computing device for a predetermined period of time.

Clause 3. The method according to clause 1 or 2, where the first calling-enabled computing device is a smart phone.

Clause 4. The method according to clause 1, 2 or 3, where the call session request is configured to request the call forwarding server to facilitate establishing a call interaction session with the first calling-enabled computing device.

Clause 5. The method according to clause 1, 2, 3 or 4, where utilizing the at least one trained machine learning algorithm to confirm an identity of the second user based on the at least one call session interaction parameter further includes authenticating the call interaction session based on a comparison of at least two call session interaction parameters.

Clause 6. The method according to clause 1, 2, 3, 4 or 5, where the fictitious call session interaction parameter is a phone number associated with a call forwarding server that prevents another initiation of a call session request.

Clause 7. The method according to clause 1, 2, 3, 4, 5 or 6, where the verified call session request is a dynamically authenticated incoming phone call initiated by at least one other computing device.

Clause 8. The method according to clause 1, 2, 3, 4, 5, 6 or 7, where the at least one call session interaction parameter is a phone number associated with at least one other computing device.

Clause 9. The method according to clause 1, 2, 3, 4, 5, 6, 7 or 8, further including automatically preventing the first calling-enabled computing device to initiate another call interaction session with the second calling-enabled computing device in response to the automatically generated fictitious call session interaction parameter.

Clause 10. The method according to clause 1, 2, 3, 4, 5, 6, 7, 8 or 9, where the first telecommunication network is at least one external telecommunication data aggregator.

Clause 11. A method may include: a computer-implemented method including: instructing, by at least one processor of a call forwarding server, a first calling-enabled computing device associated with a first user to obtain, via at least one graphical user interface (GUI) having at least one programmable GUI element, a permission from the first user to monitor a plurality of calling-related activities executed within the first calling-enabled computing device; receiving, by the at least one processor of the call forwarding server, a call session request from a second calling-enabled computing device associated with a second user; wherein the call session request comprises at least one call session interaction parameter associated with the first calling-enabled computing device; utilizing, by the at least one processor of the call forwarding server, at least one trained machine learning algorithm to confirm an identity of the second user based on the at least one call session interaction parameter so as to confirm the call interaction session as a verified call interaction session when the at least one call session interaction parameter is associated with at least one of a particular entity, a particular individual, or a particular physical location based on a database of known session interaction parameters; for the verified call interaction session: automatically generating, by the at least one processor of the call forwarding server, a fictitious call session interaction parameter that differs from the at least one call session interaction parameter associated with the second calling-enabled computing device of the second user, wherein the fictitious call session interaction parameter is configured to prevent the first calling-enabled computing device to initiate another call interaction session with the second calling-enabled computing device; automatically instructing, by the at least one processor of the call forwarding server, the first calling-enabled computing device, to prevent, based on the automatically generated fictitious call session interaction parameter, the first calling-enabled computing device to initiate another call interaction session with the second calling-enabled computing device.

Clause 12. The method according to clause 11, further including instructing the first calling-enabled computing device to continually monitor the plurality of calling-related activities executed within the first calling-enabled computing device for a predetermined period of time.

Clause 13. The method according to clause 11 or 12, where the first calling-enabled computing device is a smart phone.

Clause 14. The method according to clause 11, 12 or 13, where the call session request is configured to request the call forwarding server to facilitate establishing a call interaction session with the first calling-enabled computing device.

Clause 15. The method according to clause 11, 12, 13 or 14, where utilizing the at least one trained machine learning algorithm to confirm an identity of the second user based on the at least one call session interaction parameter further includes authenticating the call interaction session based on a comparison of at least two call session interaction parameters.

Clause 16. The method according to clause 11, 12, 13, 14 or 15, where the fictitious call session interaction parameter is a phone number associated with a call forwarding server that prevents another initiation of a call session request.

Clause 17. A system may include: a non-transient computer memory, storing software instructions; at least one processor of a first computing device associated with a user; where, when the at least one processor executes the software instructions, the first calling-enabled computing device is programmed to: instruct a first calling-enabled computing device associated with a first user to obtain, via at least one graphical user interface (GUI) having at least one programmable GUI element, a permission from the first user to monitor a plurality of calling-related activities executed within the first calling-enabled computing device; receive a call indication when the first calling-enabled computing device receives a call session request from a second calling-enabled computing device associated with a second user; where the call session request comprises at least one call session interaction parameter associated with the first calling-enabled computing device; utilize at least one trained machine learning algorithm to confirm an identity of the second user based on the at least one call session interaction parameter to so as to confirm the call interaction session as a verified call interaction session when the at least one call session interaction parameter is associated with at least one of a particular entity, a particular individual, or a particular physical location based on a database of known session interaction parameters; for the verified call interaction session: automatically generate a fictitious call session interaction parameter that differs from the at least one call session interaction parameter associated with the second calling-enabled computing device of the second user, where the fictitious call session interaction parameter is configured to prevent the first calling-enabled computing device to initiate another call interaction session with the second calling-enabled computing device; automatically instruct the first calling-enabled computing device to modify the call session request into a verified call session request by replacing the at least one call session interaction parameter with the at least one fictitious call session interaction parameter; and where the fictitious session interaction parameter is configured to prevent the first calling-enabled computing device to initiate another call interaction session with the second calling-enabled computing device.

Clause 18. The system according to clause 17, where the software instructions further include instructing the first calling-enabled computing device to continually monitor the plurality of calling-related activities executed within the first calling-enabled computing device for a predetermined period of time.

Clause 19. The system according to clause 17 or 18, where the software instructions further include automatically preventing the first calling-enabled computing device to initiate another call interaction session with the second calling-enabled computing device in response to the automatically generated fictitious call session interaction parameter.

Clause 20. The system according to clause 17, 18 or 19, where the fictitious call session interaction parameter is a phone number associated with a call forwarding server that prevents another initiation of a call session request.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A computer-implemented method comprising:
   instructing, by at least one processor of a call forwarding server, a first calling-enabled computing device associated with a first user to obtain, via at least one graphical user interface (GUI) having at least one programmable GUI element, a permission from the first user to monitor a plurality of calling-related activities executed within the first calling-enabled computing device;
   receiving, by the at least one processor of the call forwarding server, a call session request from a second calling-enabled computing device associated with a second user;
   wherein the call session request comprises at least one call session interaction parameter associated with the first calling-enabled computing device;
   utilizing, by the at least one processor of the call forwarding server, at least one trained machine learning algorithm to confirm an identity of the second user based on the at least one call session interaction parameter so as to confirm the call interaction session as a verified call interaction session when the at least one call session interaction parameter is associated with at least one of a particular entity, a particular individual, or a particular physical location based on a database of known session interaction parameters;
   for the verified call interaction session:
   automatically generating, by the at least one processor of the call forwarding server, a fictitious call session interaction parameter that differs from the at least one call session interaction parameter associated with the second calling-enabled computing device of the second user, wherein the fictitious call session interaction parameter is configured to prevent the first calling-enabled computing device to initiate another call interaction session with the second calling-enabled computing device;
   automatically modifying, by the at least one processor of the call forwarding server, the call session request into a verified call session request by replacing the at least one call session interaction parameter with the at least one fictitious call session interaction parameter;
   automatically utilizing, by the at least one processor of the call forwarding server, a first telecommunication network to transmit the verified call session request with the at least one fictitious session interaction parameter to the first calling-enabled computing device;
   automatically instructing, by the at least one processer of the call forwarding server, the first calling-enabled computing device, when receiving the verified call session request, to modify a call session notification graphical user interface (GUI) to display, via at least one programmable output GUI element of the call session notification GUI, notification data, comprising:
   at least one identifier associated with the identity of the second user,
   the at least one fictitious session interaction parameter, and
   an indication that is configured to indicate that the verified call session request has been verified as being legitimate; and
   wherein the fictitious session interaction parameter is configured to prevent the first calling-enabled computing device to initiate another call interaction session with the second calling-enabled computing device.

2. The computer-implemented method of claim 1, further comprising instructing the first calling-enabled computing device to continually monitor the plurality of calling-related activities executed within the first calling-enabled computing device for a predetermined period of time.

3. The computer-implemented method of claim 1, wherein the first calling-enabled computing device is a smart phone.

4. The computer-implemented method of claim 1, wherein the call session request is configured to request the call forwarding server to facilitate establishing a call interaction session with the first calling-enabled computing device.

5. The computer-implemented method of claim 1, wherein utilizing the at least one trained machine learning algorithm to confirm an identity of the second user based on the at least one call session interaction parameter further comprises authenticating the call interaction session based on a comparison of at least two call session interaction parameters.

6. The computer-implemented method of claim 1, wherein the fictitious call session interaction parameter is a phone number associated with a call forwarding server that prevents another initiation of a call session request.

7. The computer-implemented method of claim 1, wherein the verified call session request is a dynamically authenticated incoming phone call initiated by at least one other computing device.

8. The computer-implemented method of claim 1, wherein the at least one call session interaction parameter is a phone number associated with at least one other computing device.

9. The computer-implemented method of claim 1, further comprising automatically preventing the first calling-enabled computing device to initiate another call interaction session with the second calling-enabled computing device in response to the automatically generated fictitious call session interaction parameter.

10. The computer-implemented method of claim 1, wherein the first telecommunication network is at least one external telecommunication data aggregator.

11. A computer-implemented method comprising:
    instructing, by at least one processor of a call forwarding server, a first calling-enabled computing device associated with a first user to obtain, via at least one graphical user interface (GUI) having at least one programmable GUI element, a permission from the first user to monitor a plurality of calling-related activities executed within the first calling-enabled computing device;
    receiving, by the at least one processor of the call forwarding server, a call session request from a second calling-enabled computing device associated with a second user;
    wherein the call session request comprises at least one call session interaction parameter associated with the first calling-enabled computing device;
    utilizing, by the at least one processor of the call forwarding server, at least one trained machine learning algorithm to confirm an identity of the second user based on the at least one call session interaction parameter so as to confirm the call interaction session as a verified call interaction session when the at least one call session interaction parameter is associated with at least one of a particular entity, a particular individual, or a particular physical location based on a database of known session interaction parameters;

for the verified call interaction session:

automatically generating, by the at least one processor of the call forwarding server, a fictitious call session interaction parameter that differs from the at least one call session interaction parameter associated with the second calling-enabled computing device of the second user, wherein the fictitious call session interaction parameter is configured to prevent the first calling-enabled computing device to initiate another call interaction session with the second calling-enabled computing device;

automatically instructing, by the at least one processer of the call forwarding server, the first calling-enabled computing device, to prevent, based on the automatically generated fictitious call session interaction parameter, the first calling-enabled computing device to initiate another call interaction session with the second calling-enabled computing device.

12. The computer-implemented method of claim 11, wherein the first calling-enabled computing device to continually monitor the plurality of calling-related activities executed within the first calling-enabled computing device for a predetermined period of time.

13. The computer-implemented method of claim 11, wherein the first calling-enabled computing device is a smart phone.

14. The computer-implemented method of claim 11, wherein the call session request is configured to request the call forwarding server to facilitate establishing a call interaction session with the first calling-enabled computing device.

15. The computer-implemented method of claim 11, wherein utilizing the at least one trained machine learning algorithm to confirm an identity of the second user based on the at least one call session interaction parameter further comprises authenticating the call interaction session based on a comparison of at least two call session interaction parameters.

16. The computer-implemented method of claim 11, wherein the fictitious call session interaction parameter is a phone number associated with a call forwarding server that prevents another initiation of a call session request.

17. A system comprising:

a non-transient computer memory, storing software instructions;

at least one processor of a first computing device associated with a user;

wherein, when the at least one processor executes the software instructions, the first calling-enabled computing device is programmed to:

instruct a first calling-enabled computing device associated with a first user to obtain, via at least one graphical user interface (GUI) having at least one programmable GUI element, a permission from the first user to monitor a plurality of calling-related activities executed within the first calling-enabled computing device;

receive a call indication when the first calling-enabled computing device receives a call session request from a second calling-enabled computing device associated with a second user;

wherein the call session request comprises at least one call session interaction parameter associated with the first calling-enabled computing device;

utilize at least one trained machine learning algorithm to confirm an identity of the second user based on the at least one call session interaction parameter to so as to confirm the call interaction session as a verified call interaction session when the at least one call session interaction parameter is associated with at least one of a particular entity, a particular individual, or a particular physical location based on a database of known session interaction parameters;

for the verified call interaction session:

automatically generate a fictitious call session interaction parameter that differs from the at least one call session interaction parameter associated with the second calling-enabled computing device of the second user, wherein the fictitious call session interaction parameter is configured to prevent the first calling-enabled computing device to initiate another call interaction session with the second calling-enabled computing device;

automatically instruct the first calling-enabled computing device to modify the call session request into a verified call session request by replacing the at least one call session interaction parameter with the at least one fictitious call session interaction parameter; and wherein the fictitious session interaction parameter is configured to prevent the first calling-enabled computing device to initiate another call interaction session with the second calling-enabled computing device.

18. The system of claim 17, wherein instructing the first calling-enabled computing device to continually monitor the plurality of calling-related activities executed within the first calling-enabled computing device for a predetermined period of time.

19. The system of claim 17, wherein the software instructions further comprise automatically preventing the first calling-enabled computing device to initiate another call interaction session with the second calling-enabled computing device in response to the automatically generated fictitious call session interaction parameter.

20. The system of claim 17, wherein the fictitious call session interaction parameter is a phone number associated with a call forwarding server that prevents another initiation of a call session request.

* * * * *